United States Patent [19]

Takiyama et al.

[11] Patent Number: 5,115,032

[45] Date of Patent: May 19, 1992

[54] CURABLE RESIN COMPOSITION

[75] Inventors: Eiichiro Takiyama, Kamakura; Ryushi Ogura, Takasaki; Noriaki Harigai, Hasuda, all of Japan

[73] Assignee: Showa Highpolymer Co., Ltd., Tokyo, Japan

[21] Appl. No.: 442,570

[22] Filed: Nov. 29, 1989

[51] Int. Cl.$^5$ ............................................. C08F 291/12
[52] U.S. Cl. .................................. 525/279; 525/289; 525/290; 525/291; 525/350; 525/395; 525/535
[58] Field of Search ................ 526/286, 283; 525/290, 525/291, 189, 289, 395, 535, 279

[56] References Cited

U.S. PATENT DOCUMENTS

| | | | |
|---|---|---|---|
| 2,842,526 | 7/1958 | Smith | 528/374 |
| 3,081,352 | 3/1963 | Gardner | 568/61 |
| 3,832,421 | 8/1974 | Morgan | 428/419 |
| 3,843,572 | 10/1974 | Morgan | 428/462 |
| 4,342,863 | 8/1982 | Hohokabe | 528/360 |

FOREIGN PATENT DOCUMENTS 1282220 11/1989 Japan .

OTHER PUBLICATIONS

Grant and Hackh's Chemical Dictionary, 5th Ed., McGraw-Hill, New York, 1987, pp. 22; 461.

*Primary Examiner*—Joseph L. Schofer
*Assistant Examiner*—M. Nagumo
*Attorney, Agent, or Firm*—Oblon, Spivak, McClelland, Maier & Neustadt

[57] ABSTRACT

Curable resin compositions comprising (A) polyene components, and (B) unsaturated alicyclic compounds having thiol groups. The compositions are odorless and also excellent in heat resistance, adhesion properties and mechanical properties compared with conventional polyene-polythiols.

6 Claims, No Drawings

CURABLE RESIN COMPOSITION

BACKGROUND OF THE INVENTION

This invention relates to a polyene/thiol type of curable resin composition having a variety of uses, and especially to a resin composition useful in the fields of paints, coatings and adhesives.

It has been well known that a combination of polyene and polythiol components can be cured by adding a photo-reaction initiator thereto (as shown, for example, in Japanese Patent Publication No. 28959/1987).

As polyene components other than those disclosed in said patent, diallylidene pentaerythriol of the following formula, for example has been known (refer to Japanese Publication No. 25574/1987).

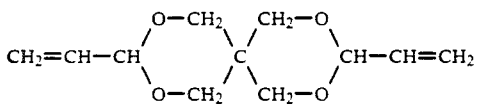

The most undesirable disadvantage of the polyene/thiol type of resin is a mercaptan odor generated from polythiol which is a fatal obstacle to practical use at the present stage.

Accordingly, the resin is, in fact hardly used in spite of its prominent physical characteristics especially adhesive properties.

An additional, disadvantage of the polyene/thiol type of resin, is its relatively poor heat resistance because the bonding structure thereof after curing is an aliphatic thioether one.

It is the objects of this invention to remove the practical obstacle due to mercaptan odor that is an disadvantage of said polyene-polythiol type of photo-curable resin as well as to obtain increased heat resistance, adhesive properties and mechanical strength.

SUMMARY OF THE INVENTION

As the result of various investigations by the present inventors for solving said problems, they discovered that such problems as odor, heat resistance, etc. can be solved by providing a resin composition comprising (A) an oligomer or a polymer having at least two reactive carbon-carbon double bonds or at least one reactive carbon-carbon triple bond in a molecule and having a molecular weight of at least 1,000 (hereinafter referred simply to as polymer (A)) and (B) a reaction-product having a thiol group and alicyclic structure in the molecule, which is obtained by reacting an unsaturated alicyclic compound having at least two unsaturated bonds in the molecule as well as having at least one bond thereof being in the ring with polythiol compound having at least two thiol groups at a proportion where the total number of thiol groups of the polythiol compounds are in excess of total number of unsaturated bonds of the unsaturated alicyclic compounds.

DETAILED DESCRIPTION OF THE INVENTION

For a better understanding of this invention, if the invention is illustrated by way of dicyclopentadiene as an unsaturated alicyclic compound tetrathiol compound as a polythiol compound and, the reaction-product (B) of this invention may be shown by the following model:

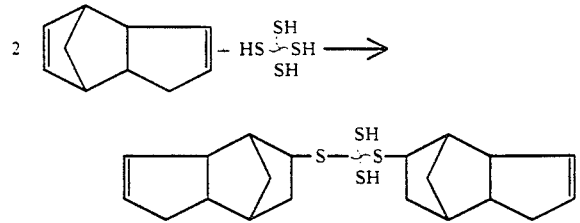

The two unsaturated bonds of the dicyclopentadiene differ in their reactivities, the unsaturated bond in the bridged ring having an endomethylene structure reacting quickly with the thiol group, and the unsaturated bond in the unbridged five-membered ring being less reactive, therefore making it easy to keep the thiol groups unreacted.

Naturally, the reaction between the ene and thiol group is conducted by addition of the hydrogen atom of the thiol group to an unsaturated bond of ene, that is, the reaction proceeds along the following formulae.

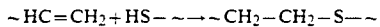

Therefore, at least two thiol groups must be contained in one molecule for the polymerization thereof, and the same is true for the unsaturated bonds.

As for the reaction-product (B) in this invention, even if the reaction-product (B) does not have two thiol groups, it has unsaturated bonds, and it can therefore be used when the unsaturated bonds of the polymer (A) to be reacted are radically curable, preferably (meth)acryloyl group.

In this case, a competitive reaction will occur between the unsaturated bonds and thiol groups, or between the unsaturated bonds themselves. When the unsaturated bonds in the polymer (A) are poor in radically curing properties, the reaction-product (B) according to this invention needs at least two thiol groups in one molecule.

As for the reaction-product (B) according to this invention, the addition between the corresponding polythiol compound and, for example, dicyclopentadiene will provide complete elimination of the mercaptan odor of the thiol compound in spite of the existence of partly residual thiol groups unreacted.

In this case, the dicyclopentadiene being an opponent compound to the polythiol compound also has a strong odor and therefore cannot be handled in the open, but the odors of both compounds will dramatically disappear if they are mixed and even partially reacted.

As for unsaturated alicyclic compounds having at least two unsaturated bonds in the molecule as well as at least one of the bonds in the corresponding ring, the commercially available ones all possess an unusual odor and can be handled in a manner similar to that for dicyclopentadiene.

On the contrary, polyene compounds with little odor which have at least two of various types of unsaturated bonds, for example as represented by the following general formulae, will not eliminate the mercaptan-like odor of polythiol even when they are used together and reacted with the polythiol.

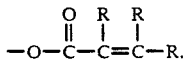

-continued

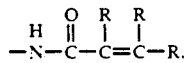

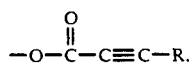

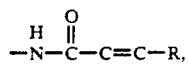

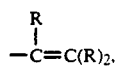

where, R represents a hydrogen atom, phenyl group or alkyl group having 1-9 carbon atoms.

As for the polythiol compounds for forming the reaction-product (B) used in this invention, the following type of compounds are given, which are polythiol having molecular weight of at least about 50 and a general formula of

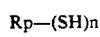

where Rp is a polyvalent organic group, and n is an integer greater than one, or a formula of

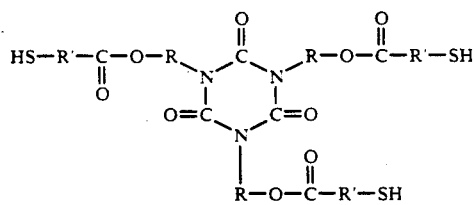

where R and R' are alkylene groups having carbon atoms of 1 to 4.

As for polythiol compounds, a variety of compounds can be given, from the standpoint of odor and physical properties of the final products thereof, products obtained by the esterification of polyols with thioglycolic acid or mercaptopropionic acid being preferable. As for examples, pentaerythriol tetrathioglycol, pentaerythriol tetrathiopropionate, trimethylolpropane trithioglycolate, trimethylolpropane trithiopropionate, hexanediol dithiopropionate and the like can be given. Among them, polythiol compounds being more than divalent are most preferable for allowing thiol groups to be residual. In addition, thiobisphenol A and polyvalent thiols having cyanuric or isocyanuric structures are also available.

Unsaturated alicyclic compounds for forming the reaction-product (B) with the combined use of said polythiol compounds have at least two unsaturated bonds per molecule at least one of which is in the ring, a most typical one being dicyclopentadiene, which is available at low cost and most preferable for the object of this invention. Other than the same, the following compounds, for example, can be given and satisfactorily used.

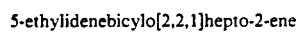

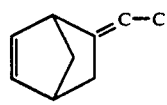

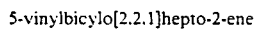

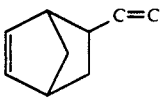

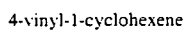

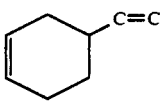

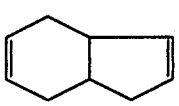

In the literature many compounds such as cyclopentadiene, cyclododecatriene are given, and compound worth using next to dicyclopentadiene is the above mentioned (I) of 5-ethylidenebicylo[2,2,1]hepto-2-ene, i.e., ethylidene norbonene.

The reaction between the polythiol compound and the unsaturated alicyclic compound requires a residual thiol group in the reaction-product (B). Therefore, the reaction must be conducted at a ratio so that the total number of thiol groups in a polythiol compound exceeds the total number of unsaturated bonds in an unsaturated alicyclic compounds. As for the actual ratios thereof, proportions of two or more thiol groups to one unsaturated bond are preferable.

Such ratios, however, as stated above depend on the type of the polymer (A).

Synthesis of the reaction-product (B) is carried out by merely mixing the polythiol compound with the unsaturated alicyclic compound and continuing heating or cooling of the mixture until the necessary addition is realized.

The polymer (A) in this invention has a molecular weight of at least 1000, and is an oligomer or polymer which has at least two reactive carbon-carbon double bonds or at least one reactive carbon/carbon triple bond. The term reactivity as used herein means a carbon/carbon unsaturated bond permitting polymerization or addition reaction with the thiol group. As for suitable examples of reactive unsaturated bonds, carbon/carbon double bonds such as an allyl group, (meth)acrylolyl group, vinyl group, isopropenyl group, etc. and triple bonds such as a propargyl group, etc. (herein referred to simply as unsaturated bond) can be given.

As the polymer (A) used in this invention has a molecular weight of at least 1000, it can improve the properties of cured products such as heat resistance, adhesive properties and mechanical strength, etc. Also changes in the skeleton structure of the polymer can provide versatility with the cured products.

There are certain methods for synthesizing the polymer (A) in the invention and generally they can produced by allowing polymers (a) having functional groups to react with unsaturated compounds (b) being reactive to said groups. In such case changes in the types of the polymers and unsaturated compounds can provide versatility with the cured products.

As for said reactions, considering the ease of reaction, urethane reaction or esterification is preferable. Therefore typically, urethane reaction between a polymer (a) having active hydrogen, e.g. a hydroxyl group with an unsaturated compound (b) having isocyanate group, or vice versa, a urethane reaction between a polymer (a) having an isocyanate group with an unsaturated monoalcohol (b) can be given. Similarly the polymer (A) can be synthesized by the esterificiation of the polymer (a) and the unsaturated compound (b) which have respectively either one of a hydroxyl or epoxy group and a carboxyl or acid anhydride group leading to an esterification reaction.

As for polymers (a) for synthesizing the polymers (A) in this invention, polymers having an isocyanate group, acid anhydride group, carboxyl group, hydroxyl group or epoxy group are given; concretely phenoxy resins, saturated or unsaturated alkyds, epoxyacrylates, polyester polyols, polyether polyols, saponified vinyl acetate-ethylene copolymers, etc. are given.

As for other polymers, a polymer (a) which is produced by copolymerizing a polymerizable monomer (i) having carbon/carbon double bond with a polymerizable monomer (ii) having a double bond being polymerizable with said monomer as well as said functional groups can be given.

If the monomer (i) which forms the backbone chain of the polymer (a) is a polymerizable monomer having carbon/carbon double bond, there is no need for restrictions thereto, and for example, styrene, vinyltoluene, chlorostyrene, acrylic esters, methacrylic esters, acrylonitrile, vinyl chloride, vinylidene chloride, vinyl pyrrolidone, vinyl actae, etc. are typical monomers, and they can be used singly or as mixture thereof.

The monomer (ii) which has said functional groups being the other component of the copolymer (a) is a monomer having a functional group such as an isocyanate group, acid anhydride group, carboxyl group, hydroxyl group, epoxy group or the like leading to urethane reaction or an esterification reaction. Among these, as a monomer with an isocyanate group, isocyanate ethyl methacrylate is given, as a monomer with an acid anhydride group, e.g. maleic anhydride and itaconic anhydride are given, as a monomer with a carboxyl group e.g. acrylic acid and methacrylic acid are given, as a monomer with a hydroxyl group, e.g unsaturated monoalcohols such as 2-hydroxyethyl acrylate, 2-hydroxypropyl acrylate, 2-hydroxyethyl methacrylate, 2-hydroxypropyl methacrylate, methylolacrylamide are given, as a monomer with an epoxy group glycidil (meth)acrylate and mono(meth)acrylate of epoxy resin, etc. are given as representative examples.

Further, the unsaturated compound (b), which introduces an unsaturated bond into the polymer (a) having said functional group, is a compound having an unsaturated bond and reactive group such as a hydroxyl group, epoxy group, isocyanate group, carboxyl group or the like which brings about a urethane reaction or esterification reaction with the functional group in the polymer (a). As for this compound (b), the following compounds are used depending on the type of functional group in the polymer (a). For example, as for the compound (b) which leads to esterification with the acid anhydride group of the polymer (a), unsaturated alcohols e.g. 2-hydroxyethyl acrylate, propargyl alcohol etc. as described above; as for the compound (b) which undergoes esterification with the carboxy group of the polymer (a), an unsaturated monoepoxy compound e.g. glycidyl (meth)acrylate, in particular glycidyl methacrylate, mono(meth)acrylate of epoxy resin etc., as for the compound (b) which brings about the urethane reaction with the hydroxy group of the polymer (a), isocyanate ethyl methacrylate and an unsaturated isocyanate obtained by the reaction of the polyvalent isocyanate with said monoalcohol such as 2-hydroxyethyl acrylate etc., and the like are given; and as for the compound (b) which leads to esterification with the epoxy group in the polymer (a), acrylic acid, methacrylic acid etc. are given.

Although it is ideal for said unsaturated isocyanate having (meth)acryloyl group to have both a (meth)acryloyl group and an isocyanate group, with a view to preventing gelation during reaction, it is necessary that the residual proportion of the isocyanate group in the unsaturated isocyanate be permitted to be in the range of 0.2–0.9(molar ratio) by reacting not less than one mole of unsaturated monoalcohol with one mole of polyvalent isocyanate. For example, it is necessary to make the isocyanate group residual by reacting unsaturated monoalcohol in the range of 1.1 to 1.8 moles with one mole of polyvalent isocyanate, and the residual isocyanate groups are used for the reaction with the hydroxy groups attached to the backbone chain of the polymer (a) obtained from monomers (i) and (ii).

As stated above there are various type of polymers used for the polymer (A), among which side chain-unsaturated polymers having a (meth)acryloyl group at the side chain via a urethane bond or ester bond are preferable example.

Hereinafter, typical concrete examples of the polymer (A) with a (meth)acryloyl group at the side chain according to this invention and the methods of preparation thereof will be illustrated.

(1) Side chain-unsaturated polymer having a (meth)acryloyl group at the side chain via a urethane bond.

(I) This type of polymer is described in Japanese patent Laid-open Nos. 230019/1984, 38403/1985 and 109815/1987, as follows:

A curable side chain-unsaturated polymer (A) may be obtained from the copolymer (a) having a hydroxy group at the side chain and the unsaturated isocyanate (b) which is an addition product of polyvalent isocyanate and unsaturated monoalcohol having a (meth)acryloyl group, and has free isocyanate by reacting the hydroxy group of (a) with the isocyanate group of (b) in polymerizable monomer.

Concretely, as for a polymer (a) containing a hydroxyl group at the side chain, phenoxy resin and copolymer of 2-hydroxyethyl(meth)acrylate or 2-hydroxypropyl(meth)acrylate and styrene may be used and unsaturated isocyanate (b) being an addition product of tolylene diisocyanate and 2-hydroxyethyl(meth)acrylate or 2-hydroxypropyl-(meth)acrylate is reacted with said polymer (a) containing hydroxy group at the side chain, thus obtained polymer (A) is the most preferred one.

(II) A curable side chain-unsaturated polymer (A) obtained by reacting the copolymer (a) having hydroxy group at the side chain with isocyanate ethyl methacrylate (b) can also be employed.

(III) A curable side chain-unsaturated polymer (A) obtained by reacting a copolymer (a) containing an isocyanate group at the side chain produced by polymerizing isocyanate ethyl methacrylate with a vinyl monomer such as styrene, methylmethacrylate, etc. with unsaturated monoalcohol (b) having a (meth)acryloyl group can also be used.

(2) Side chain-unsaturated polymer having (meth)acryloyl group at the side chain via ester linkage.

(IV) As for the polymer, a side chain-unsaturated polymer (A) obtained by reacting copolymer (a) having a glycidyl group at the side chain with (meth)acrylic acid (b) is given.

Concretely, a polymer which is produced by reacting (meth)acrylic acid with a copolymer of styrene and glycidyl(meth)acrylate by esterification is suitable. Also said polymer using allylglycidyl ether in place of a part of the glycidyl(meth)acrylate is suitably employed.

(V) A polymer obtained by reacting a copolymer (a) containing carboxy group at the side chain with unsaturated epoxy compound (b) can be given. Concretely, a polymer produced by reacting glycidyl(meth)acrylate with a copolymer of styrene and (meth)acrylic acid is suitable.

(VI) A polymer obtained according to the method disclosed in Japanese Patent Laid-open No. 258817/1986.

[Process A]Copolymer (a) is prepared which has an epoxy group at the side chain of the polymer produced by copolymerizing, using a radical polymerization catalyst, vinyl monomer with a component containing an unsaturated epoxy resin at least as a component, and the unsaturated epoxy resin comprises a (meth)acryloyl group and an epoxy group in the molecule produced by reacting at least one mole of epoxy resin with one mole of (meth)acrylic acid. Then,

[Process B]To said copolymer (a) is added (meth)acrylic acid (b) being substantially equimolar to the residual epoxy group in the reaction mixture obtained by "Process A" for reacting the epoxy group with the carboxyl group to produce an unsaturated side chain-polymer (A).

As for the epoxy resin, a bisphenol type of epoxy resin, novolac type of epoxy resin and alicyclic epoxy resin are preferably used.

(VII) Unsaturated side chain-polymer is produced by reacting said unsaturated epoxy resin (b) having both the epoxy and (meth)acryloyl groups obtained by the reaction of (meth)acrylic acid with epoxy resin with copolymer (a) containing a carboxyl group at the side chain which is obtained by polymerization of a vinyl monomer with (meth)acrylic acid.

The epoxy resins to be used are the same as those mentioned above.

(VIII) Unsaturated side chain-polymer (A) is given which is produced by reacting unsaturated monoalcohol (b) having a (meth)acryloyl group with copolymer (a) containing an acid anhydride group at the side chain.

Concretely, as a polymer with an anhydride group, using a copolymer of styrene with maleic anhydride, and with said copolymer is reacted 2-hydroxyethyl-(meth)acrylate or 2-hydroxypropyl(meth)acrylate to obtain a most preferred corresponding polymer.

In addition, a polymer with no free carboxyl group is also available in this invention, which is obtained by reacting the free carboxyl group resulting from esterification with a monomer having an epoxy group or both hydroxy and (meth)acryloyl groups.

Conventional methods are employed for the copolymerization reaction, urethane reaction and esterfication reaction to synthesize the polymer (A) in accordance with this invention. For example, for the copolymerization reaction, radical catalysts such as organic peroxides, azo-compounds, etc. are employed, and for the esterfication reaction reactive catalysts such as tertiary amines, amine salts, quarternary ammonium salts, metal salts, etc. are employed for accelerating the reaction.

The polymer (A) mentioned above, has a molecular weight of at least 1,000, preferably not less than 5000 and preferably not more than 100,000. As for the polymer with a molecular weight of less than 1,000, it will not necessarily have satisfactory curing properties and physical properties, and with more than 100,000, too high of viscosity will be provided, resulting in poor operating performance.

The rate of unsaturated compound (b) in the polymer (A) is desirably in the range of 1 mole % to 30 mole % and most suitably 5 mole % to 20 mole %.

In addition, certain methods are available wherein reacting unsaturated monobasic acid, e.g. (meth)acrylic acid or crotonic acid with an unsaturated polyester comprising itaconic acid as one component and a polymer having an epoxy group at the side chain.

The polymer (A) can be used by dissolving them into a polyfunctional monomer.

If necessary, the combined use of epoxy resin is available.

The polymer (A) and reaction-product (B) are used together at an equivalent ratio of unsaturated bond to thiol group of 1:0.8-1.2.

In order to cure compositions according to this invention, the combined use of an initiator with photo or heat is required.

In general, photo-curing is mainly used, but heat-curing using organic peroxide is also useful in the field of adhesion.

As for the photo-initiators used for the invention, commercially available products are satisfactory. As for the example of these initiators there are given benzoin ethers, benzyl ketals, acetophenone derivatives or combinations between amine and aromatic ketone, and combinations of thioxanthone and amine. As for organic peroxides used for heat-curing, ketone peroxide, diacyl peroxide, peroxy ketal, hydroperoxide, peroxy ester, peroxy carbonate, etc. are given.

Further, azo compounde can also be employed. An initiator of 0.1-10 parts by wt. preferably of 0.5-5 parts by wt. is used to 100 parts by wt. of resin composition.

As for the components of the composition according to this invention, components such as filler, reinforcing material, dye, pigment, polymer etc. can be used together as needed.

EXAMPLES

To aid in the understanding of this invention, the following examples are given.

EXAMPLE 1

Preparation of Dicyclopentadiene-thiol Addition Product (A)

Into a 1-liter separable flask equipped with stirrer, dropping funnel, reflux condenser and thermometer were placed 490 g of pentaerythritol tetrathiopropionate and 0.2 g of methyl-p-benzoquinone. To the mixture was dropped 132 g of dicyclopentadiene. At the same time that the dropping was started, the temperature of the mixture began to rise, so it was cooled to not allow its temperature to become over 60° C.

After dropping, the mixture was reacted for 2 hours being permitted to increase in temperature up to 80° C.

From the results of gas chromatograph measurement, it was confirmed that no free dicyclopentadiene was residual.

Addition product (A) was produced having a viscosity of about 100 poise and a Harzen color number of 100.

As for the addition product (A), neither the characteristic odor of thiol nor the malodor of dicyclopentadiene were sensed, and therefore this was substantially odorless.

Synthesis of Unsaturated Side Chain-bonding Type Polymer (B)

Into a 1-liter separable flask equipped with stirrer, reflux condenser, thermometer and gas introducing tubing were placed 200 g of phenoxy resin (molecular weight: about 25,000) and 400 g of methyl ethyl ketone, and then the contents was dissolved homogeneously into a solution at 60°-70° C. with stirring.

Then to the solution was added 30 g of isocyanate ethyl methacrylate, 0.5 g of dibutyltin dilaurate and 0.12 g of methyl-p-benzoquinone, and the mixture was then reacted at 70° C. for 4 hours. It was determined by infrared spectophotometric analysis that the free isocyanate group had disappeared. A light yellowish brown liquid of unsaturated side chain-bonding type polymer (B) (methyl ethyl ketone solution) was obtained.

50 parts (part by weight, and so on) of addition product (A), 450 parts of polymer (B) and 2 parts of 2-hydroxy-2-methyl-1-phenylpropan-1-one Darocure 1173 made by Merck & Co. as photo-initiator were mixed, and the mixture was coated to a thickness of 50 μ on a copper foil with a thickness of 35 μ, then after air drying the coatings at 60°-70° C. for 1 hour, was passed through at a rate of 2 m/min. beneath 3 ultraviolet lamps having an output of 120 w/cm each.

The hardness of the cured coating was H, and the adhesion of coating passed a 360-degree folding test of 100/100 and 1 mm.

No occurence of blister peeling was confirmed even after 60 sec above a 260° C. bath of molten solder.

EXAMPLE 2

Synthesis of Unsaturated Side Chain-bonding Type Polymer (C)

Into a 3-liter separable flask equipped with stirrer, reflux condenser, thermometer and gas introducing tubing were placed 888 g of butyl acrylate, 106 g of acrylonitrile, 155 g of isocyanate ethyl methacrylate, 893 g of ethyl acetate and 11 g of azobisisobutyronitrile, and polymerization was carried out for 6 hours in an atmosphere of nitrogen by raising the temperature of the contents along with refluxing ethyl acetate, then 6 g of azobisisobutyronitrile was additionally added to perform another 6 hour's polymerization.

The polymerization rate of the polymer obtained reached 96%. The average molecular weight thereof was about 95,000. After stopping the polymerization by adding methyl-p-benzoquinone, 58 g of allyl alcohol and 6 g of dibutyltin dilaurate were added and the mixture was reacted at 70° C. for 6 hours. Then it was concluded by infrared spectrophotometric analysis that free isocyanate groups and hydroxyl groups had disappeared. In addition, the irritating odor of allyl alcohol could not be detected. Also, a light yellowish brown liquid of polymer (C) having an allyl urethane type of unsaturated bond at its side chain was obtained.

210 g of polymer (C), 65 g of dicyclopentadiene/pentaerythriol tetrathiopropionate addition product (A) used in EXAMPLE 1, and 3 g of 2,2-dimethoxy-2-phenyl-acetophenone Irgacure #651 made by Ciba Geigy as a photo-initiator were mixed, and the mixture was coated in a 10 mm width on glass plate of 20 mm. 20 mm, 5 mm, followed by air drying at 100° C. for 10 min., then the glass plates were stacked on their coated faces to be photo-cured according to the same conditions as in EXAMPLE 1.

An adhesive strength test by compression broke the glass plates at a force of about 70 kg/cm².

EXAMPLE 3

Synthesis of Dicyclopentadiene/thiol Addition Product (D)

Into a 1-liter separable flask equipped with stirrer, reflux condenser and thermometer were placed 400 g of isocyanuric tetrathiopropionate (made by Shikoku Fine Co., Ltd.) shown by the next formula

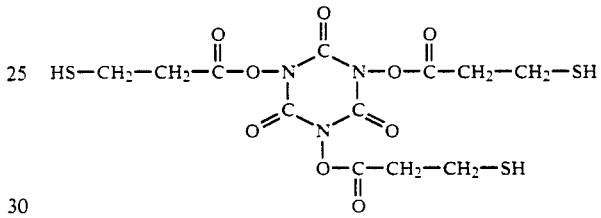

as well as 1329 dicyclopentadiene and 0.1 g of methyl-p-benzoquinone. The mixture was, at the starting, reacted at not more than 40° C. for 2 hours, then additionally at 60°-65° C. for 2 hours. It was found that the malodor of thiol and the characteristic odor of dicyclopentadiene had disappeared.

The GPC measurement showed that about 90% of the addition product (D) measured had a peak at an average molecular weight of about 580. Therefore, it was recognized that the product was a compound obtained by the addition between dicyclopentadiene and thiol at a molar ratio of 1:1.

A light yellowish brown addition product (D) was obtained having a viscosity of 113 poise.

Unsaturated Polymer (E) with Triple Bond at the Side Chain

To 600 g of methyl ethyl ketone solution of phenoxy resin (a solution into which 200 g of phenoxy resin and 400 g of methyl ethyl ketone are dissolved homogeneously) produced by the EXAMPLE 1, were added 120 g of unsaturated isocyanate (50% methyl ethyl ketone solution) produced by reacting 67 g of propargyl alcohol with 222 g of isophorone diisocyanate and 1 g of dibutyltin dilaurate, and allowed to undergo reaction at 65°-70° C. till the disappearance of the isocyanate group was confirmed by infrared spectrophotometric analysis.

A light yellowish brown polymer with a viscocity of 34 poise having triple bond at the side chain was obtained.

A photo-curing solder resist ink was prepared according to the following composition.
  unsaturated polymer (E) (methyl ethyl ketone solution): 720 g
  ene/thiol addition product (D): 155 g
  barium sulfate: 200 g phthalocyanine green: 2 g
aerosil: 10 g
Darocure #1173: 10 g
t-butyl perbenzoate: 5 g This ink was coated on a paper/phenol substrate of copper laminated sheet by a bar coater to form coating with a thickness of 100 μ, then after air-drying the coating at 80°–90° C. for 10 min., it was passed at a rate of 1.5 m/min. 10 cm beneath 3 ultraviolet radiation lamps with an output of 120 W/cm each.

The physical properties of the resist coating obtained were as follows:
adhesion of coating (cell test): 100/100
coating hardness: 2H-3H
260° C.-soldering heat resistance: 60 sec. acceptable
260° C.-flux soldering resistance: 60 sec. acceptable
insulating properties: at least $10^{13}$ ohm

EXAMPLE 4

Preparation of Ethylidene
Norbornene/trimethylolpropane Trithioglycolate Addition Product (F)

Into a 1-liter separable flask equipped with stirrer, reflux condenser, thermometer, gas introducing tubing were placed 712 g of trimethylolpropane trithioglycolate and 120 g of ethylidene norbornene, and the moment when the mixture was homogeneously stirred, reaction started with exothermic heat.

Cooling the mixture so as to prevent the temperature from going up to over 40° C., and after the completion of exothermic change, reaction was continued at 60°–65° C. for 2 hours resulting in complete elimination of both the characteristic odor of thiol and the odor of ethylidene norbornene.

Substantially no residual unsaturated bond was recognized from the results of NMR analysis.

After adding 0.2 g of methyl-p-benzoquinone thereto, a light yellowish brown addition product (F) having a viscosity of 134 poise was produced.

Synthesis of Polyester Resin (G) Using Itaconic Acid

Into a 2-liter separable flask equipped with stirrer, reflux condenser, thermometer, gas introducing tubing were placed 130 g of itaconic acid, 146 g of adipic acid, 216 g of endomethylenetetrahydrophthalic anhydride, 320 g of diethyleneglycol, 40 g of trimethylolpropane and 0.4 g of hydroquinone, and esterfication was conducted at 170°–180° C. in an atmosphere of nitrogen to obtain a polyester having an acid value of 39.1 and a hydroxyl value of 50.6. Further, 0.8 g of adipic acid was added thereto, and the reaction was conducted at 170°–175° C. for 1 hour resulting in substantial elimination of hydroxyl value and production of a light yellowish syrup unsaturated polyester (G) with an acid value of 97.4. The molecular weight thereof was about 2,000.

| | |
|---|---|
| addition product (F) | 50 parts |
| polyester resin (G) | 50 parts |
| epoxy resin | 30 parts |
| (tetrad-X made by Mitsubishi Gas Chemical Co., Ltd.) | |
| t-butyl-p-benzoate | 3 parts |
| 2-ethyl-4-methylimidazole | 3 parts |

The mixture specified above was homogeneously kneaded, and then applied to a thickness of 30 μ between a 35 μ thickness of copper foil and a 50 μ thickness of polyimide film to be bonded together. The obtained specimens were heat-cured at 120° C. for 2 hours to begin with, then 150° C. for 6 hours.

After cooling the specimens to room temperature, a 180-degree of peel strength was measured to obtain a strength of 1.8–2.1 kg/cm, and the soldering resistance at 260° C. for 60 sec. was admissible.

EXAMPLE 5

Synthesis of Polyester/acrylate (H)

Into a 1-liter separable flask equipped with stirrer, reflux condenser, thermometer, gas introducing tubing were placed 148 g of phthalic anhydride, 140 g of glycidyl methacrylate, 3 g of ethylene glycol, 1.5 g of triphenylphosphine and 0.12 g of hydroquinone, and the mixture was allowed to undergo chemical reaction at 130°–135° C. with vigorous agitation by steam blowing for 3 hours to obtain an acid value of 21.8, then 110 g of ethylene glycol dimethacrylate was added for additional reaction at 110°–120° C. for 2 hours.

The final acid value was 14.0 on solid content basis. The peak of molecular weight by GPC was about 2,400.

Additional charge of 100 g of ethylene glycol dimethacrylate formed a light yellowish polyester acrylate (H) having a viscosity of 28.1 poise.

Into 100 parts of polyester/acrylate (H) were homogeneously dissolved 130 parts of the addition product (A) used in EXAMPLE 1, 3.5 parts of Darocure #1173 and 2.5 parts of bis-4-(-t-butylcyclohexyl)peroxy dicarbonate (Percadox #16 by Kayaku Nuri Co., Ltd.), and the solution was poured into a 3 mm-gap of glass plates treated with releasing agent. After radiating the solution through the glass plates from both sides thereof with a 250 W sunlamp for 1 hour, it was cured at 70° C. for 2 hours.

The resin poured was cured resulting in a Rockwell hardness M of 95 and a bending strength of 12.1–13.7 g/mm$^2$.

Curable resin compositions according to this invention are odorless and excellent in heat resistance, adhesion properties and mechanical strength compared with conventional polyene/polythiol type of resins, therefore, they are unexpectedly useful in the applications for paint, coating, adhesive agent and the like.

What is claimed is:

1. A curable resin composition comprising:
   a component (A) which is a polymer having at least two reactive carbon-carbon double bonds are at least one reactive carbon-carbon triple bond at its side chain and having a molecular weight of at least 1,000,
   and a component (B) which is a reaction-product having at least one thiol group and alicyclic structure in the molecule, which is obtained by reacting an unsaturated alicyclic compound having at least two unsaturated bonds in the molecule, at least one unsaturated bond thereof being in the ring, with a polythiol compound having at least two thiol groups; in a proportion whereby the total number of thiol groups of the polythiol compound are in excess of the total number of unsaturated bonds of the unsaturated alicyclic compound.

2. A composition according to claim 1 wherein said polymer has a molecular weight of at least 5,000.

3. A curable resin composition according to claim 1 wherein said component (A) is a side chain-unsaturated polymer having a (meth)acryloyl group at the side chain via a urethane bond or ester bond.

4. A curable resin composition according to claim 3 wherein said component (A) is a component selected form a group consisting of a reaction product of phenoxy resin and isocyanate ethyl methacrylate, a reaction product of butyl acrylate, acrylonitrile and isocyanate ethyl methacrylate and a reaction product of phenoxy resin and an unsaturated isocyanate produced by reacting propargyl alcohol with isophorone diisocyanate.

5. A curable resin composition according to claims 1, 2, 3 or 4 wherein said unsaturated alicyclic compound is dicyclopentadiene.

6. A curable resin composition according to claims 1, 2, 3 or 4 wherein said component (B) is a component selected from a group consisting of a reaction product of pentaerythritol tetrathiopropionate and dicyclopentadiene, a reaction product of isocyanuric tetrathiopropionate and dicyclopentadiene and a reaction product of trimethylolpropane trithioglycolate and ethylidene norbonene.

* * * * *